United States Patent
Hagen et al.

(10) Patent No.: US 6,748,287 B1
(45) Date of Patent: Jun. 8, 2004

(54) ADAPTIVE REAL-TIME WORK-IN-PROGRESS TRACKING, PREDICTION, AND OPTIMIZATION SYSTEM FOR A SEMICONDUCTOR SUPPLY CHAIN

(75) Inventors: Klaus ten Hagen, Sunnyvale, CA (US); Michael E. Orshansky, Oakland, CA (US)

(73) Assignee: eSilicon Corporation, Sunnyvale, CA (US)

( * ) Notice: Subject to any disclaimer, the term of this patent is extended or adjusted under 35 U.S.C. 154(b) by 0 days.

(21) Appl. No.: 09/912,028

(22) Filed: Jul. 23, 2001

(51) Int. Cl.[7] .............................. G06F 19/00
(52) U.S. Cl. .................. 700/99; 700/100; 700/95; 705/8
(58) Field of Search ............ 700/95–103, 106, 700/121; 705/22, 8; 709/205

(56) References Cited

U.S. PATENT DOCUMENTS

| | | | |
|---|---|---|---|
| 5,140,537 A | * 8/1992 | Tullis | 703/6 |
| 5,586,021 A | * 12/1996 | Fargher et al. | 700/100 |
| 5,818,716 A | * 10/1998 | Chin et al. | 700/100 |
| 6,049,742 A | * 4/2000 | Milne et al. | 700/99 |
| 6,446,022 B1 | * 9/2002 | Coss et al. | 702/121 |
| 6,486,899 B1 | * 11/2002 | Bush, Jr. | 345/855 |
| 2002/0188513 A1 | * 12/2002 | Gil et al. | 705/22 |
| 2002/0188682 A1 | * 12/2002 | Jaln et al. | 709/205 |

OTHER PUBLICATIONS

An integrated approach to planning and scheduling at Philips Semiconductors Malmstrom, C.; Semiconductor Manufacturing Conference Proceedings, 1997 IEEE International Symposium on Oct. 6–8, 1997 Page(s): D27 –D29.*

NTool delivers its Web–Enabled Project Management Tool to UMC. Jun. 12, 2000. http://www.umc.com/english/news/20000612.asp.*

* cited by examiner

Primary Examiner—Leo Picard
Assistant Examiner—Alexander Kosowski
(74) Attorney, Agent, or Firm—Fenwick & West LLP

(57) ABSTRACT

A work-in-progress (WIP) tracking system is used to coordinate a semiconductor supply chain. The WIP tracking receives WIP updates from semiconductor supply chain vendors and generates advanced notices based on an analysis of the WIP updates and predetermined rules. The advanced notices are delivered to downstream vendors to reduce semiconductor manufacturing cycle time and unpredictability between different semiconductor manufacturing phases.

46 Claims, 15 Drawing Sheets

| Phase | Vendor | Estimated Time (Days) |
|---|---|---|
| Order Processing | ASIC Provider | 3 |
| GDSII Preparation | ASIC Provider | 19 |
| Fabrication | Fab | 61 |
| Probe Card Making | Test/Assembly House | 56 |
| Package Design | Test/Assembly House | 56 |
| Wafer Transfer | Freight Forwarder | 1 |
| Packaging | Test/Assembly House | 3 |
| Parts Transfer | Freight Forwarder | 1 |
| Test & Debug | ASIC Provider | 5 |
| Parts Transfer | Freight Forwarder | 1 |
| TOTAL | | 94 |

FIG. 2A

| Phase | Vendor | Estimated Time(Days) |
|---|---|---|
| Order Processing | Fabless ASIC Provider | 5 |
| Fabrication | Foundry | 68 |
| Wafer Transfer | Freight Forwarder | 1 |
| Package/Test | Test/Assembly House | 15 |
| Parts Transfer | Freight Forwarder | 1 |
| TOTAL | | 90 |

FIG. 2B

| Step No. | Step Name | Step Group |
|---|---|---|
| 1 | WAF-1 | Wafer Start |
| 9 | TRCH1-CMP | Wafer Start |
| 11 | SAC1-OX | Wafer Start |
| 25 | PO1-DP | Gate Mask |
| 27 | PO1-ET | Gate Mask |
| 63 | ME1-PH | Metal 1 |
| 64 | ME1-ET | Metal 1 |
| 76 | VA2-CMP | Metal 3 |
| 76 | VA2-CMP | Metal 3 |
| 117 | PA1-PH | Metal 6 |
| 120 | WAT 2-1 | WAT |
| 121 | SORT | SORT |

FIG. 2C

|  | Customer Order 1 | Customer Order 2 |
|---|---|---|
| Time Stamp | 12:20 am, 06/20/01 | 12:20 am, 06/20/01 |
| Foundry ID | 5910 | 5920 |
| Lot ID | 5910-1 | 5920-2 |
| Current Step | WAF1-START | WAF1-START |
| Current Quantity | 25 | 25 |
| ... | ... | ... |

FIG. 2D

PRODUCT GRAPH 600

LOT GRAPH 1
Node 10

| | Original | Actual | intRevised |
|---|---|---|---|
| Start Date | 12/31 | --- | 12/31 |
| Duration | 1 | --- | 1 |
| QTY | --- | --- | --- |

Node 11

| | Original | Actual | intRevised |
|---|---|---|---|
| Start Date | 1/1 | --- | 1/1 |
| Duration | 1 | --- | 1 |
| QTY | --- | --- | --- |

Process Flow 709 for Lot ID 702

| Step | Expected Duration | Conversion Factor |
|---|---|---|
| 10 | 1 | 200 |
| 11 | 1 | 200 |

FIG. 7A

PRODUCT GRAPH 600

LOT GRAPH 1
Node 10

| | Original | Actual | intRevised |
|---|---|---|---|
| Start Date | 12/31 | 1/1 | 1/1 |
| Duration | 1 | 5 | 1 |
| QTY | 25 | 25 | 25 |

Node 11

| | Original | Actual | intRevised |
|---|---|---|---|
| Start Date | 1/1 | 1/6 | 1/6 |
| Duration | 1 | 1 | 1 |
| QTY | 25 | 24 | 24 |

WIP Update 310B for Lot ID 702

| Date | Step | QTY |
|---|---|---|
| 1/6 | 11 | 24 |

FIG. 7C

ADAPTIVE REAL-TIME WORK-IN-PROGRESS TRACKING, PREDICTION, AND OPTIMIZATION SYSTEM FOR A SEMICONDUCTOR SUPPLY CHAIN

CROSS-REFERENCE TO RELATED APPLICATION

This application relates to U.S. patent application Ser. No. 09/912030, "Prediction Based Optimization of a Semiconductor Supply Chain Using an Adaptive Real-time Work-in-progress Tracking System," by Michael E. Orshansky and Klaus ten Hagen, filed on even date herewith, which subject matter is incorporated herein by reference.

BACKGROUND OF THE INVENTION

1. Field of the Invention

This invention relates generally to efficient operation of a semiconductor supply chain, and more particularly, to providing a work-in-progress (WIP) tracking system and generating a variety of WIP tracking reports and advance notices, in order to coordinate different vendors in the semiconductor supply chain.

2. Description of the Related Art

A typical semiconductor manufacturing process includes multiple phases. For example, a wafer foundry (or fab) begins with raw silicon wafers and fabricates integrated circuits on these wafers. A test vendor may test the integrated circuits and mark the good die on the wafer. An assembly/packaging vendor may dice the wafer into separate die and assemble the good die into various packages with appropriate electrical connections. A final test vendor may perform final testing of the finished packaged part to make sure that the chips are operating according to specification. A shipping vendor may transport the WIP between the different supply chain vendors and finally distribute the finished good parts to their intended destination. Thus, the semiconductor supply chain may include many separate entities, all of which shall be referred to as vendors.

As the semiconductor manufacturing process becomes more complex, companies in this industry are specializing. As a result, customers, such as fabless semiconductor companies and integrated device manufacturers, are using an increasing number of semiconductor supply chain vendors for prototype development or mass production of integrated circuits. In other words, generally speaking, the semiconductor supply chain contains an increasing number of vendors. This raises new difficulties in coordinating the entire chain, and leads to complex logistical problems so that many steps in the design and manufacturing of chips are dominated by queuing, scheduling and preparation time. This is especially true for very successful foundries that are being completely focused on wafer manufacturing and have high stakes in maintaining predictable flow of goods to and from them. Thus, it would be beneficial for semiconductor companies to efficiently utilize their supply chain as this can lead to shortened product cycles and enhanced responsiveness to market demand.

However, one characteristic of the semiconductor industry is that vendors in a semiconductor supply chain are often located in different time zones, in different countries, or speak different languages, making person-to-person communications difficult. In addition, manufacturing data and other information provided by the vendors may be in incompatible formats or have other deficiencies such as providing unreliable prediction of product quantity or shipment date. The resulting difficulty in effective communication and information sharing throughout the supply chain can cause significant barriers to productivity improvement and adaptation to dynamic market demand. Substantial semiconductor manufacturing cycle time is consumed by the queuing, scheduling and preparation processes at the supply chain vendors. At the same time, the market is continuously demanding increased productivity and faster response time. As a result, it is becoming increasingly significant for the semiconductor industry to provide advanced methods to coordinate the operations of the supply chain vendors to increase efficiency.

However, there are significant barriers to doing so. In the semiconductor industry, the supply chain vendors and their end customers are frequently competitors. As a result, supply chain vendors may be justifiably reluctant to disclose large amounts of information to the customers and customers may be similarly reluctant, as this information may reveal significant information about the vendors' or customers' businesses. In addition, information given to a supply chain vendor must be reliable and preferably should be presented in a concise and meaningful way in order to be most useful to the vendor. This often does not happen.

In one approach to supply chain coordination, certain vendors have proposed a community information center model to exchange manufacturing data and information with a view to strengthening collaboration among vendors. Under this model, participating vendors send all of their manufacturing data and information to an information hub and retrieve data pertinent to products in their supply chain. However, this model faces considerable obstacles to adoption. For example, there are concerns regarding revealing supply chain vendors and customers' confidential information in the process of pooling the manufacturing data at one location and allowing unrestricted access to the data, particularly since supply chain vendors and customers may be competitors. An open information sharing process will give rise to a strong reluctance among the supply chain vendors and customers to participate in information exchange or sharing. Further, such a model requires complex business-to-business integration in data connectivity and interchangeability. The implementation and maintenance of such a system would be both costly and difficult. As a result of these deficiencies, this model has failed to achieve widespread adoption.

Therefore, in view of the reality of the semiconductor industry, what is needed is a system and method to coordinate operations of semiconductor supply chain vendors while addressing the needs and concerns of customers and supply chain vendors. In particular, it would be beneficial to establish a sustained and targeted information channel between vendors in the supply chain and to provide various advance notices to vendors.

SUMMARY OF INVENTION

The present invention overcomes limitations and disadvantages of current semiconductor supply chain management methods by providing a work-in-progress (WIP) tracking system to generate a variety of WIP tracking reports and/or advance notices to supply chain vendors and/or customers to coordinate the semiconductor supply chain.

In one embodiment, the present invention allows a significant reduction in cycle-time of a semiconductor supply chain by the use of advance notices. In one implementation, the advance notices include messages to supply chain vendors predicting how much material will arrive at the supply chain vendor at a certain time. As a result, the supply chain vendors can optimize their processing schedule and reduce the impact caused by any unpredictable incidents or errors occurring on other supply chain vendors.

In one embodiment, the advance notices are generated by a WIP tracking system. The WIP tracking system receives manufacturing data and information from supply chain vendors (WIP updates) and processes the WIP updates to determine whether to generate advance notices to supply chain vendors. In one approach, the WIP tracking system includes a data representation of the supply chain. The WIP updates are used to revise the representation, and the process for generating advance notices is based on analysis of the data representation according to rules adapted to the needs of the downstream supply chain vendors. In one embodiment, an advance notice is generated if the WIP analysis indicates that a triggering event will occur within a predetermined amount of time (e.g., work at one vendor will be completed and delivered to the next vendor within x days).

To improve the reliability and accuracy of the advance notices, one embodiment of the WIP tracking system performs consistency checking of WIP updates to detect and prevent missing or misleading WIP updates, thus increasing the accuracy of the data representation and also the advance notices. In another embodiment, the WIP tracking system derives statistically qualified advance notices with respect to product arrival time and quantity, again improving the reliability of the advance notices. Another embodiment of the WIP tracking system provides an alert engine that detects significant deviations from the last revised plan in schedule and/or quantity and by that increases customers' confidence in the accuracy of the advance notices. If an alert is generated, the data representation is revised in order to derive a more reliable estimation of WIP and final product arrival time and quantity, including for the purpose of more accurate advance notice generation.

The generation of advance notices results in numerous benefits. As mentioned previously, advance notices generally increase the efficiency of the semiconductor supply chain, by allowing vendors to schedule work and allocate resources in advance. Furthermore, by using a separate WIP tracking system, WIP updates which could contain sensitive vendor information are not shared en masse with all other vendors and customers. Rather, the WIP updates are analyzed and only the relevant portion (e.g., an advance notice) is made available only to those vendors which are affected. The other information is retained by the WIP tracking system and is not forwarded. Thus, advance notices enable quality information exchange between potentially competitive vendors in the supply chain while ensuring confidentiality of their business practices. As a final example, by distilling the received WIP updates into advance notices, the WIP tracking system also concentrates the useful information sent to a vendor. It is easier for a vendor to understand a simple advance notice rather than wade through large volumes of raw WIP updates.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2A illustrates an overview of a prototype/NRE workflow in a semiconductor supply chain;

FIG. 2B illustrates an overview of a mass production workflow in a semiconductor supply chain;

FIG. 2C illustrates an example of process flow data provided by a foundry within a prototype/NRE workflow;

FIG. 2D illustrates an example of the WIP updates from a foundry;

FIG. 7A illustrates an initialization process of a graph-based WIP tracking system;

FIG. 7C illustrates an updating process of a graph-based WIP tracking system;

DESCRIPTION OF THE PREFERRED EMBODIMENTS

The semiconductor industry is nowadays under escalating pressure to reduce the cycle time from the integrated circuit (IC) chip design phase to the volume production phase. One approach is to use efficient methods to coordinate supply chain operations. However, such efforts are impeded by various practical obstacles such as complexity in business-to-business integration and concerns for business confidentiality. The present invention is provided to coordinate operations of a semiconductor supply chain with multiple vendors, while adequately addressing these practical barriers. The present invention reduces timing and quantity uncertainty in the supply chain, thus reducing overall cycle time, by generating and disseminating targeted work-in-progress (WIP) reports and/or advance notices, which reduce voluminous manufacturing data and information into a form which caters to the needs of supply chain vendors and customers. It also maintains business confidentiality for supply chain vendors and benefits them for their participation in information sharing and exchange.

Figure 1:
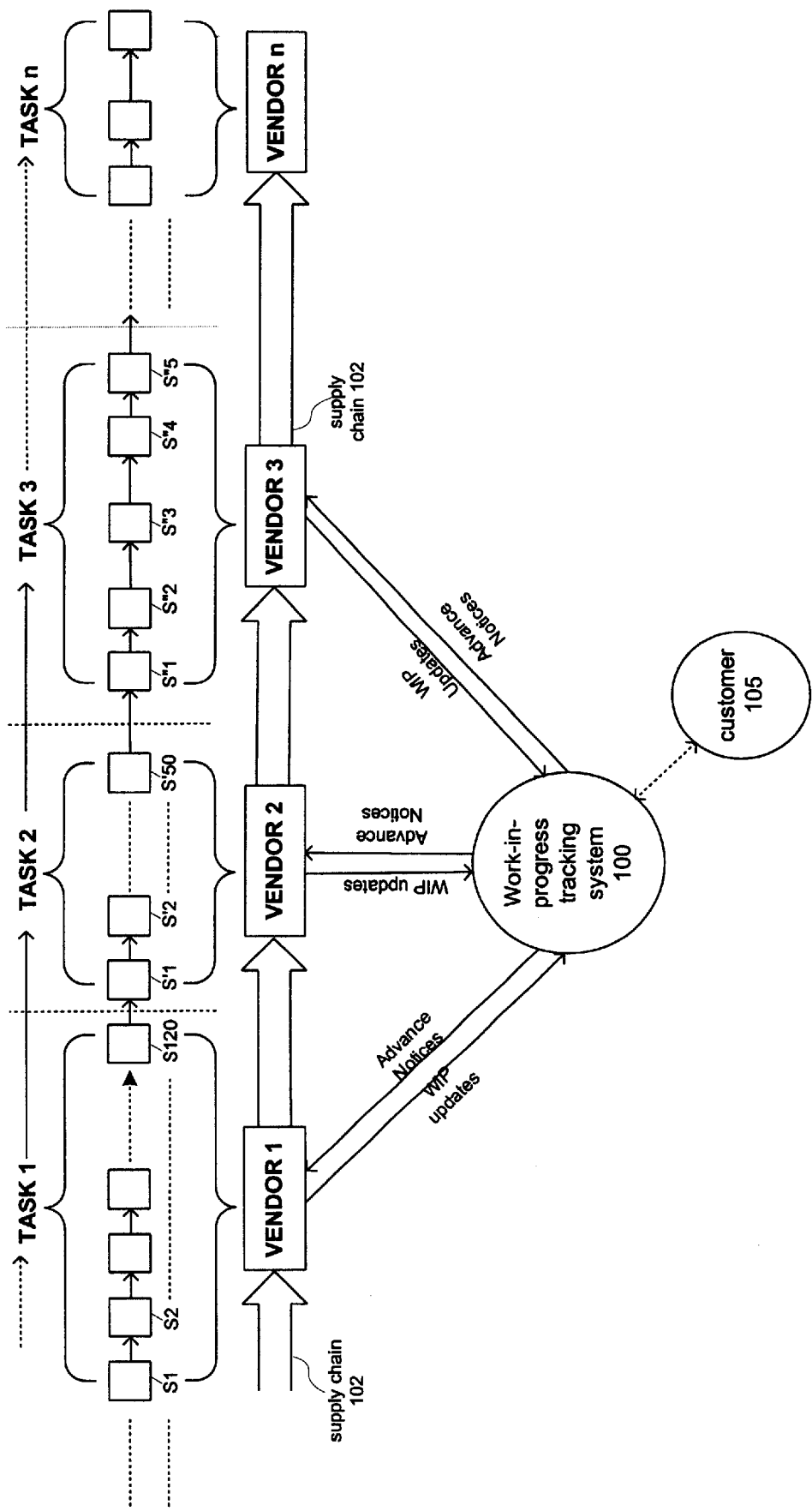
FIG. 1 is a schematic diagram illustrating a semiconductor supply chain and a semiconductor work-in-progress (WIP) tracking system.

FIG. 1 schematically illustrates an embodiment of operation of a semiconductor supply chain 102. The semiconductor supply chain 102 involves a plurality of semiconductor manufacturers and service providers, which are referred to as vendor 1, vendor 2, . . . and vendor n. Examples of vendors include wafer suppliers, wafer foundry, test vendors, providers of test boards, assembly/packaging vendors, and freight forwarders.

The example supply chain 102 in FIG. 1 is shown as a linear chain in which each vendor supplies to a next vendor in the chain. However, the invention applies equally to other types of supply chains, including those with splits (e.g., one vendor supplies to multiple next vendors) and those with joins (e.g., one vendor is supplied by multiple vendors). As an example of the former, a wafer foundry might supply processed wafers to multiple test vendors. As an example of the latter, the final test vendor may require supply from both the packaging vendor and a provider of testing boards before it can complete the final tests.

A customer 105 desires to have a semiconductor product (i.e., an IC chip) manufactured. In a common example, the customer 105 is a design house which has designed an IC chip and now desires to have it manufactured, either for subsequent sale to the general market or for internal use. The end product of the supply chain 102 is this IC chip.

In one scenario, the customer 105 contracts directly with each of the vendors in the semiconductor supply chain 102 to perform the tasks necessary to manufacture the IC product. In this case the customer will be running the WIP tracking system 100 itself. In an alternate scenario, the customer 105 orders the IC product from a fabless semiconductor provider or fabless ASIC provider, such as eSilicon Corporation of Santa Clara, Calif. The fabless semiconductor provider then coordinates the supply chain 102 on behalf of the customer 105. In FIG. 1, the fabless semiconductor provider does so via the WIP tracking system 100. One advantage of using a fabless semiconductor provider is that the provider typically has the capability to integrate a multitude of resources for semiconductor development, from design specification through manufacturing and delivery of packaged and tested parts for a customer company. In addition, the fabless semiconductor provider can typically use its experience to deliver packaged and tested integrated circuits at significant predictability and shortened cycle time.

Referring again to FIG. 1, the term task is used to refer to the entire process performed by one vendor before handing off to the next vendor. The tasks 1, 2, . . . n may be manufacturing, service or other tasks. The arrows in FIG. 1 between the tasks indicate dependencies in the semiconductor manufacturing process. Thus, task 2 performed by vendor 2 is dependent upon completion of task 1 performed by vendor 1. Accordingly, vendor 2 may be referred to as being downstream of vendor 1 or as a downstream vendor to vendor 1. Conversely, vendor 1 is upstream to vendor 2. In the same way, vendor 2 is upstream to vendors 3-n. Note that the same entity may play the roles of multiple vendors. For example, if company X performed tasks 1 and 3, but company Y performed the intervening task 2, then vendors 1 and 3 would both be company X.

Each task performed by the supply chain vendors may be a combination of multiple steps. For example, the task 1 contains steps s1, s2, . . . s120; the task 2 contains steps s'1, s'2, s'50; the task 3 contains steps s"1, s"2, . . . s"5. As further described below, for some tasks performed by the supply chain vendors, the steps may be categorized into groups (not shown in FIG. 1) according to semiconductor industry practices.

FIGS. 2A and 2B show two different workflows which may be implemented by a semiconductor supply chain 102: a prototype/NRE(non recurring engineering) workflow and a production workflow. As shown in FIG. 2A, a typical prototype/NRE workflow, focusing on delivering a tested and manufactured prototype chip, involves many phases. Some of the phases shown include GDSII preparation by the ASIC provider, fabrication at a foundry, probe card making and package design at test/assembly house, wafer transfer by freight forwarder, packaging by test/assembly house, test and debug by the wafer foundry, parts transfer by a freight forwarder to customer, etc. Some of the phases may occur concurrently. These phases may be divided among vendors in any number of ways. For example, a single vendor may carry out multiple phases of the workflow, a single phase may be carried out by multiple vendors, or there may be a one-to-one correspondence between vendors and phases. Thus it is typical in a prototype/NRE workflow that there are a large number of interactions between the supply chain vendors and the customer is often strongly interested in getting a functioning prototype in a shortest time. Therefore, it is especially valuable to provide a mechanism to reduce any unpredictability and lack of coordination between vendors in the supply chain in the case of the prototype/NRE workflow.

FIG. 2B illustrates an overview of a typical production workflow. The production workflow is usually more streamlined than the corresponding prototype/NRE workflow. The major phases involve fabrication at foundry, wafer transfer by freight forwarder, package and testing by test/assembly house, and parts transfer by freight forwarders to customer. In reality, the production workflow may be complicated. For example, the assembly task may be performed by different supply chain vendors, and thus processed wafers must be routed to different locations. In general, the production workflow is driven to meet production goals of the customer in an economical manner. It is thus critical that participating supply chain vendors are well managed to schedule manufacturing capacity for upcoming tasks to lessen the cycle time.

As explained above, each task performed by a vendor typically includes many steps. For example, a foundry vendor may perform the task of generating masks and manufacturing prototype wafers. Referring to FIG. 2C, this single task is granulated into a series of steps: WAF1-START(step 1), . . . TRCH1-CMP(step 9), SAC1-OX(step 11), . . . PO1-DP(step 25), . . . ME1-ET (step 64), . . . WAT 2-1 (step 120), SORT (step 121), etc. These steps define a process flow for a vendor. Note that not all steps are shown for the process flow described in FIG. 2C. FIG. 2C further shows that these steps can be combined into step groups according to semiconductor industry practices. FIG. 2C shows steps 1, 9 and 11 belong to the group "wafer start"; steps 63 and 64 belong to the group "metal 1 definition", etc.

The granulated semiconductor manufacturing process gives rise to barriers to improve the visibility of supply chain operations for customers and possibly also to supply chain vendors. In a workflow of manufacturing an IC product ordered by a customer, the supply chain vendors generate a large amount of data to describe the status of the product at each step. This data is often referred to as work-in-progress (WIP) updates. FIG. 2D shows one example of a typical WIP update for one lot received from a foundry vendor. The WIP update bears a time stamp indicating when it was created by the foundry vendor. The WIP update also includes some general information, such as the foundry ID and lot ID. The current status of the lot is identified by the current step (which shows that the lot was in the step "WAF1-START" when the WIP update was created) and current quantity (which shows the current number of wafers remaining in the lot). The WIP update also includes some additional information: start size (i.e., number of wafers in the lot when the lot started production) and start date (the date when processing of the lot began) in this example. This type of WIP update is sometimes referred to as a "status" update.

WIP updates can come in different formats. Another common form of WIP update includes the entire sequence of steps executed since the last update (typically including quantity and time of completion) rather than just listing the current step. This type of WIP update may be referred to as a "transaction history" update. In this case, the completion of every step typically is time stamped.

Further, vendors typically will generate WIP updates on a periodic basis for all WIP in their process. The resulting amount of data is voluminous. For example, assume that a small size fabless semiconductor provider has an annual revenue of $100 million. At an average price of $20 per chip, this fabless semiconductor provider must outsource the manufacturing of 5 million units per year. Assume that an average wafer contains 400 units and 25 wafers compose a lot, then the fabless semiconductor provider deals with 12,000 wafers or about 500 lots each year. Assuming that the average cycle time of one lot is about 4 months, at any one time, the fabless semiconductor provider will have about 167 lots in the supply chain. If the fabless semiconductor vendor receives WIP updates 3 times a day for each lot, the fabless semiconductor provider will receive 500 WIP updates per day. Such an overwhelming amount of manufacturing data and information can hardly be handled in a reliable manner without automation.

The raw WIP updates are also not meaningful to customers or other vendors. For example, other vendors usually are not concerned about what occurs at each specific step of another vendor. Instead, downstream vendors typically are interested in information which will impact their schedules. Thus, it typically is more useful for a downstream vendor to receive an advance notice stating that it can expect 2000 units in three days, rather than one which states that there are 25 wafers in step "WAF1-START." With the advance notice, the downstream vendor can prepare in advance and schedule the required capacity.

Referring again to FIG. 1, there is provided a WIP tracking system 100 which generates WIP tracking reports and advance notices to significantly improve the capability of supply chain vendors and customers to track the status of the manufacturing process. The generated WIP reports and advance notices can also be used to coordinate supply chain vendors and reduce semiconductor manufacturing cycle time.

In one embodiment, the WIP tracking system 100 is controlled by a fabless semiconductor provider. The fabless semiconductor provider may follow an ASIC, ASSP or other business model. As described above, the fabless semiconductor provider typically can integrate resources on a semiconductor supply chain and manufacture IC products for a customer 105. The fabless semiconductor provider coordinates with the supply chain vendors to establish WIP tracking system protocols, such as contents, format and frequency of WIP updates, the manner to identify individual units of products on the supply chain, etc. The protocols may be simple or complex and may differ from one vendor to the next. Ideally, all vendors would use a common protocol which is directly compatible with the WIP tracking system 100. In reality, however, each vendor may dictate its own protocol.

The fabless semiconductor provider receives the WIP updates from supply chain vendors. The data contained in the WIP updates may be relevant to different customers, different products and/or different orders for a product. The WIP tracking system 100 processes the WIP updates received from the supply chain vendors and generates various WIP reports, which are made available to supply chain vendors and customers, as well as for internal use, as applicable.

The WIP tracking system 100 maintains the confidentiality interest of the supply chain vendors and customers by adopting a targeted "push" mode in the WIP tracking system information. The WIP tracking system 100 does not allow the supply chain vendors and customers to have unfettered access to the WIP database. Rather, the WIP tracking system 100 handles the processing of WIP updates and creates specific WIP reports and advance notices according to the predetermined rules or expected needs of the supply chain vendors and customers. The WIP tracking system 100 makes the WIP tracking reports available to customers and for internal use. It also sends out advance notices to the downstream vendors within the supply chain. For example, the WIP tracking system may send the WIP reports and advance notices to the relevant parties or it may allow the relevant parties to retrieve or access the WIP reports and advance notices. As one example, a customer can retrieve information via the Internet from the WIP tracking system 100 regarding the number of good parts expected to be delivered on a scheduled date. However, the WIP tracking system 100 does not permit supply chain vendors or customers to obtain information in a way that violates the confidentiality of other vendors or customers. In this way, supply chain vendors keep confidence in the WIP tracking system and benefit from the exchange of data with the WIP tracking system.

In alternate embodiments, the WIP tracking system 100 is provided by an entity other than a fabless semiconductor provider. Such independent entity may be established for the purpose of managing the WIP tracking system. Entities that directly or indirectly contract with some or all of the supply chain vendors may be good candidates for controlling the WIP tracking system 100.

In another embodiment, the customer itself may manage the WIP tracking system 100, for example if the customer contracts directly with the supply chain vendors. Although FIG. 1 shows the WIP tracking system 100 as separate from the customer 105, this is done for ease of description and does not preclude a customer from managing the WIP tracking system 100.

Referring again to FIG. 1, the WIP tracking system 100 operates as follows to generate WIP tracking reports and advance notices for the supply chain vendors. The WIP tracking system 100 contains a data representation of the supply chain 102, the current status of WIP in the supply chain and the statistical model of process durations and yields. The WIP tracking system 100 receives periodic WIP updates from the vendors and updates the data representation of the supply chain to reflect these WIP updates. Based on the updated data representation of the supply chain, the WIP tracking system 100 generates WIP tracking reports in a form suited for customer 105 and internal use. It may also generate advance notices that are to be sent to the various vendors.

For example, the WIP tracking system 100 might receive a WIP update from vendor 1. Based on the analysis of the data representation, it will generate a set of WIP tracking reports for customer 105 and for internal use by the system 100, and also send an advance notice to vendor 2 so that vendor 2 can better plan for activity related to the WIP currently at vendor 1. The WIP update from vendor 1 may result in multiple advance notices, for example to vendor 3, 4, etc. in addition to vendor 2. Likewise, the WIP tracking system 100 might receive a WIP update from vendor 2 and generate advance notices to other vendors resulting from the WIP update. The rules for generating tracking reports and advanced notices are typically predetermined.

In one embodiment, advance notices are generated by the WIP tracking system 100 for specific supply chain vendors (the customer may also be considered one of the vendors in the supply chain). For example, vendor 3 may request and benefit from two days' advance notice of delivery of WIP from upstream vendor 2. The WIP tracking system 100 generates this advance notice based on WIP updates received from vendor 2 (and additional upstream vendors if task 2 is expected to take less than two days). An important advantage of advance notices is that they can be used to reduce cycle time and unpredictability in the operations of a semiconductor supply chain. For example, downstream vendors usually need time to prepare their facilities for WIP shipments received from upstream vendors. If the WIP shipment arrives without any advance notice, for example simply arriving on the shipping dock of the downstream vendor, the downstream vendor will not be able to process the WIP shipment right away. Instead, it will first have to spend time to prepare its facilities. With advance notice, the downstream vendor can prepare in anticipation of the WIP shipment's arrival.

In addition, reliable advance notices reassure customers and supply chain vendors that the supply chain manufacturing process is on track (or is not on track, depending on the content of the advance notice). Either way, scheduling uncertainty in the supply chain is reduced. As a result, the customer and supply chain vendors can reduce padding the schedule and can proceed with greater confidence toward meeting the delivery target. For example, the customer can schedule subsequent marketing activities with greater certainty once the ordered IC production is two-thirds complete according to an advance notice.

One advantage to using a fabless semiconductor provider is that it can collect accurate project data and perform a statistical analysis of past performances across a large arrays of products and vendors. This empirical data helps to further reduce uncertainties in scheduling.

Figure 3:
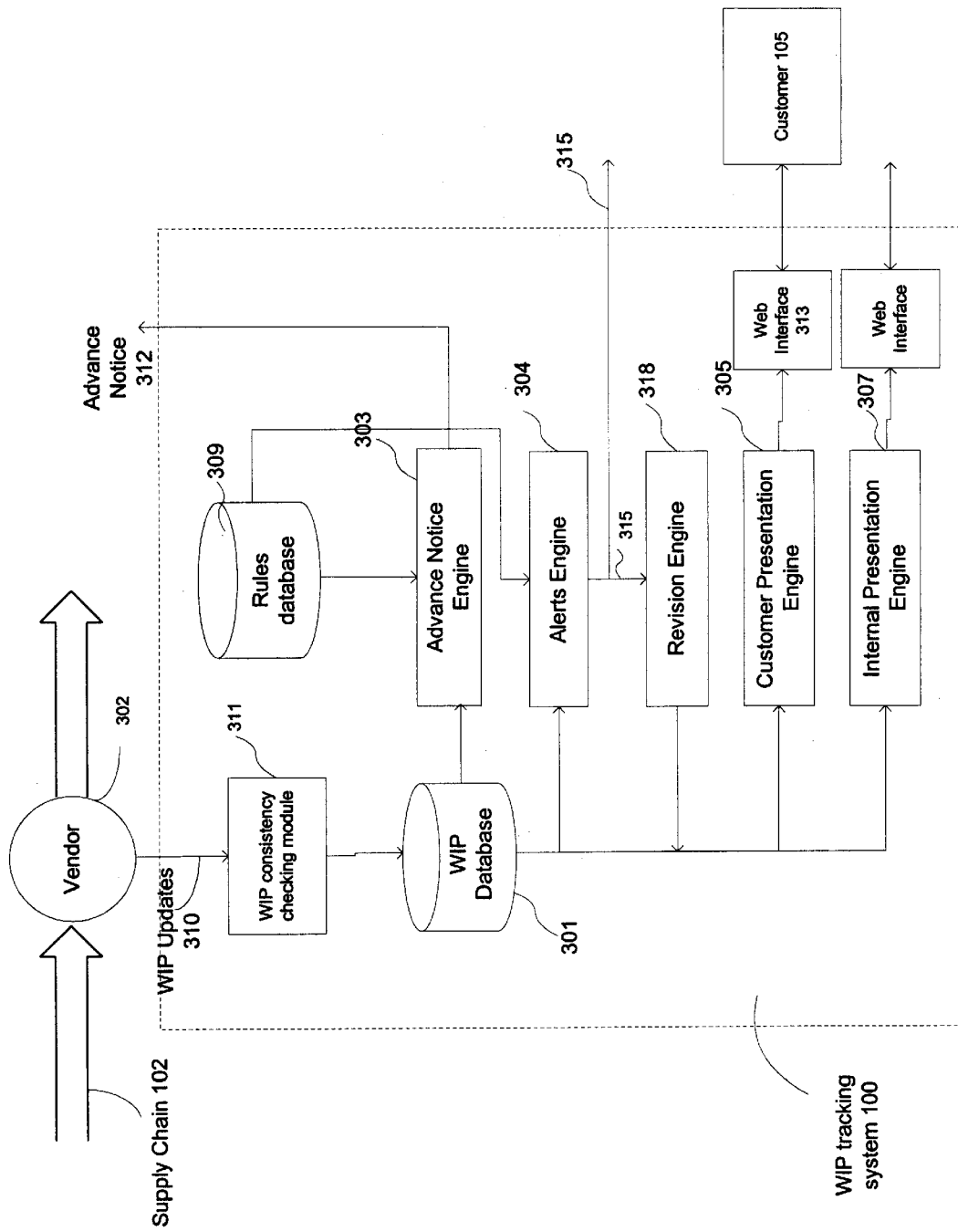
FIG. 3 is a schematic diagram illustrating an embodiment of a supply chain WIP tracking system.

FIG. 3 shows one embodiment of a WIP tracking system 100. The WIP tracking system 100 includes a WIP update consistency checking module 311, a WIP database 301, an advance notice engine 303, an alerts engine 304, a revision engine 318, a customer presentation engine 305, an internal presentation engine 307, a rules database 309 and a web interface 313. The engines 303, 304, 318, 305 and 307 can access the WIP database 301 and the rules database 309. For purposes of advance notices, the relevant part of the rules database 309 shall be referred to as the advance notice rules database 309. The engines 303, 304, 318, 305 and 307 may also communicate with each other. In one implementation, a WIP database 301 is implemented as an Oracle database and the engines 303, 304, 318, 305 and 307 are implemented as Enterprise Java Beans (EJB), Java Servlets, JavaScript, XSLT transformations and Java Server Pages (JSP). Portions of the rules database are implemented as XML files.

The various engines 303, 304, 318, 305 and 307 are shown as separate functional blocks in FIG. 3 for clarity of explanation. In reality, they may be implemented using common technology. For example, in one embodiment, the reports (not shown) generated by the internal presentation engine 307 include the WIP tracking reports 315 generated by the customer presentation engine 305. Thus, the customer presentation engine 305 and the internal presentation engine 307 may share much of the same software. Alternately, the customer presentation engine 305 may not exist separately. Instead, it may be a subset of the internal presentation engine 307.

Figure 4:
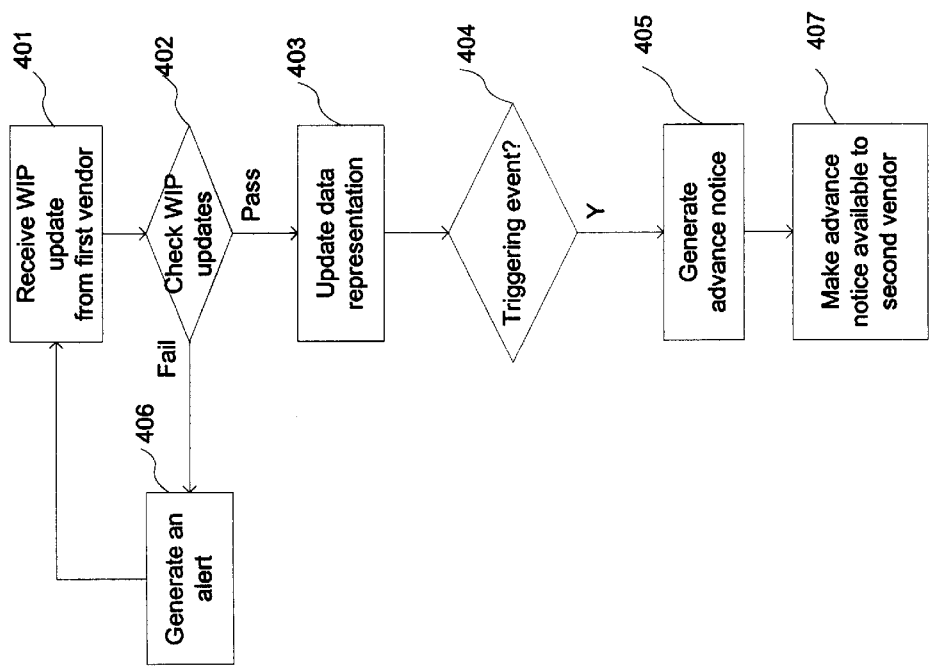
FIG. 4 is a flow chart illustrating steps of generating advance notices in a WIP tracking system.

As described above, the WIP tracking system 100 receives WIP updates 310 from supply chain vendors 302 and generates WIP tracking reports and advance notices 312 for supply chain vendors and customers. FIG. 4 illustrates a flow chart for one method of operating WIP tracking system 100. The WIP database 301 stores a data representation of the semiconductor supply chain 102, including the current status of WIP in the supply chain. Now assume that a WIP update 310 is received 401 from a first vendor 302.

The WIP updates consistency checking module ("consistency module") 311 checks 402 the received WIP update for completeness and accuracy. As an example, the consistency module 311 identifies if a WIP update contains a time stamp, the current step name, quantity of WIP, and/or if the current WIP update refers to an active lot on the supply chain, etc. The consistency module 311 may also check other consistency within the WIP updates, for example if the received update adheres to certain format.

If the information within the WIP update is missing or erroneous, the WIP update consistency checking module 311 may generate 406 an alert to report the problematic WIP update to the WIP tracking system 100 or the entities controlling the system. Upon receiving the alert from the consistency module 311, the WIP tracking system 100 may obtain correct or complete WIP updates from the vendor. If the WIP update passes the check 402, the data representation stored in the WIP database 301 is updated 403 by the revision engine 318 to reflect the WIP update 310.

The advance notice engine 303 analyzes the updated WIP database 301 to determine 404 whether to generate an advance notice 312. It does so, in part, based on the predetermined rules contained in the advance notice rules database 309. In one implementation, the rules are defined by a trigger event and a lead time. If the WIP database indicates 404 that WIP is within the lead time of the trigger event, then an advance notice 312 is generated 405. For example, under the rule for an assembly vendor, the trigger event might be "completion of wafer fabrication at the foundry vendor" and the lead time might be two days. The rule might also specify that the assembly vendor require an advance notice indicating the number of wafers affected. Thus, if the advance notice engine 303 determines that 20 wafers are estimated to be completed by the foundry vendor in two days, the advance notice engine 303 will generate 405 an advance notice, including the expected number of wafers. This is then made available 407 to the assembly vendor. For example, an email with this message might be sent to the assembly vendor. Alternately, the advance notice may be posted on a web site which is accessible by the assembly vendor.

The details of advance notices typically will vary between different vendors and customers and so will the corresponding rules. In the above example, the rules specified that the advance notice contain the number of wafers to be shipped. As another example, the rules might specify that the advance notice contain technical instructions for downstream vendors issued by an upstream vendor or a customer.

Multiple advance notices may be provided to some vendors according to the vendor's needs. For example, a first advance notice with necessary design information may be sent to a vendor two weeks before the actual WIP shipment, in order to make sure that all data is available and accepted by the supply chain vendor. Time is often lost due to the fact that design data is incomplete or not fully accepted. Another advance notice with the lot details including estimated quantity and arrival time is then sent to the same vendor two days before the estimated time of arrival.

Referring again to FIG. 3, the alert engine 304 generates alerts 315 for internal use by the WIP tracking system 100. The alerts may also be sent to the entity controlling the WIP tracking system 100 (e.g., the fabless semiconductor provider). The alert engine 304 analyzes the WIP database 301 to monitor if the current status of the supply chain deviates in schedule or quantity from the expected values, according to predetermined rules.

Alerts 315 are received by the revision engine 318. Upon receiving the alerts 315, the revision engine 318 determines whether to update the WIP database 311. The WIP database 311 typically contains estimates of future actions as well as a record of past events. Thus, if WIP is behind schedule, the revision engine 318 may revise the future estimates in order to generate a more reliable estimate of customer delivery date and to avoid the repetitive generation of alerts for events, such as delays or material scraps, that happened in the past.

FIG. 3 further shows the customer presentation engine 305 generates WIP tracking reports, which are accessible by the customer 105. In some sense, the customer presentation engine 305 generates the customer's "window" to the WIP database 301. The internal presentation engine 307 generates WIP tracking reports for the WIP tracking system 100's internal use. It is the WIP tracking system 100's "window" to the WIP database 301. The views afforded by the two windows may not be the same. In one embodiment, the WIP database 301 contains two versions of data: an intRevised set for the WIP tracking system's internal use and a exRevised set for presentation to the customer. The intRevised set provides a more raw view of the status of the supply chain; whereas the exRevised set may be filtered for presentation to the customer, typically according to the nature of the business relationship between the fabless semiconductor vendor and the customer 105.

Figure 5:
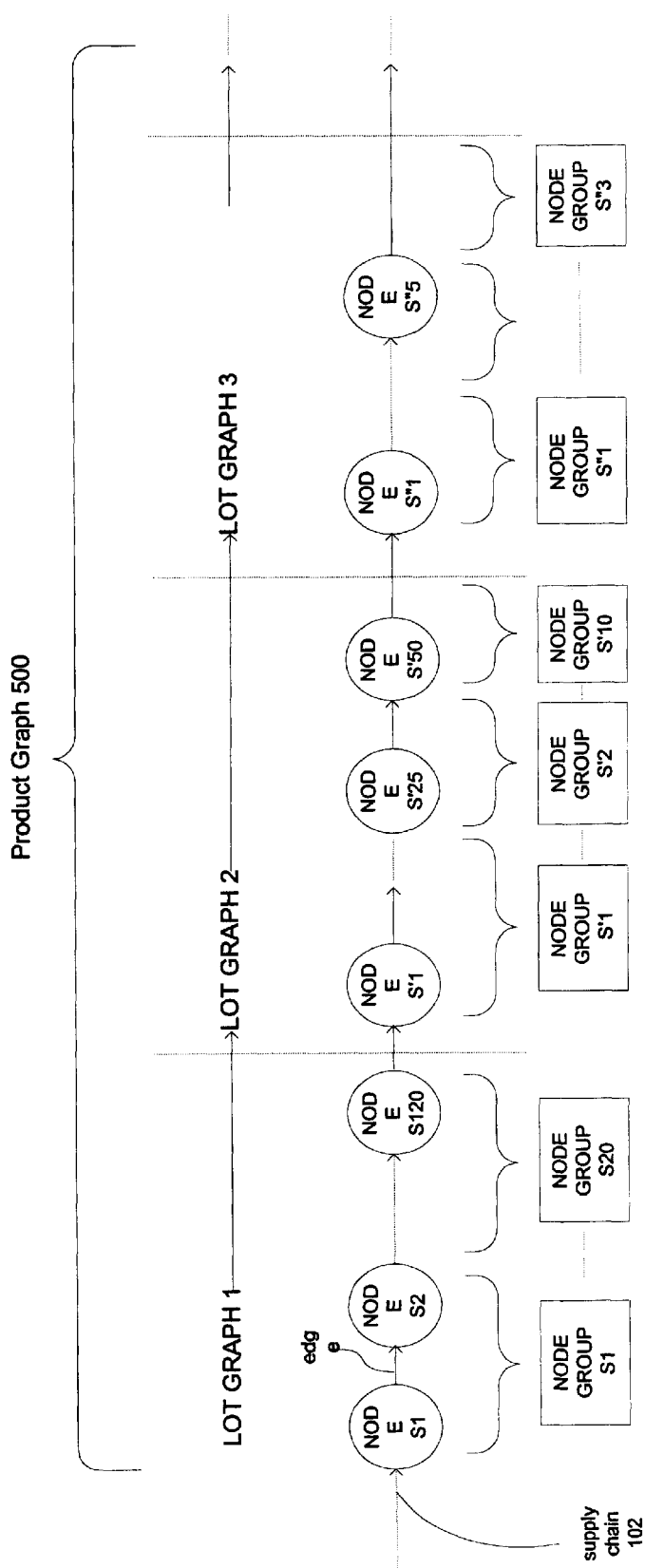
FIG. 5 illustrates a graph-based data representation of a WIP tracking system.
Figure 6:
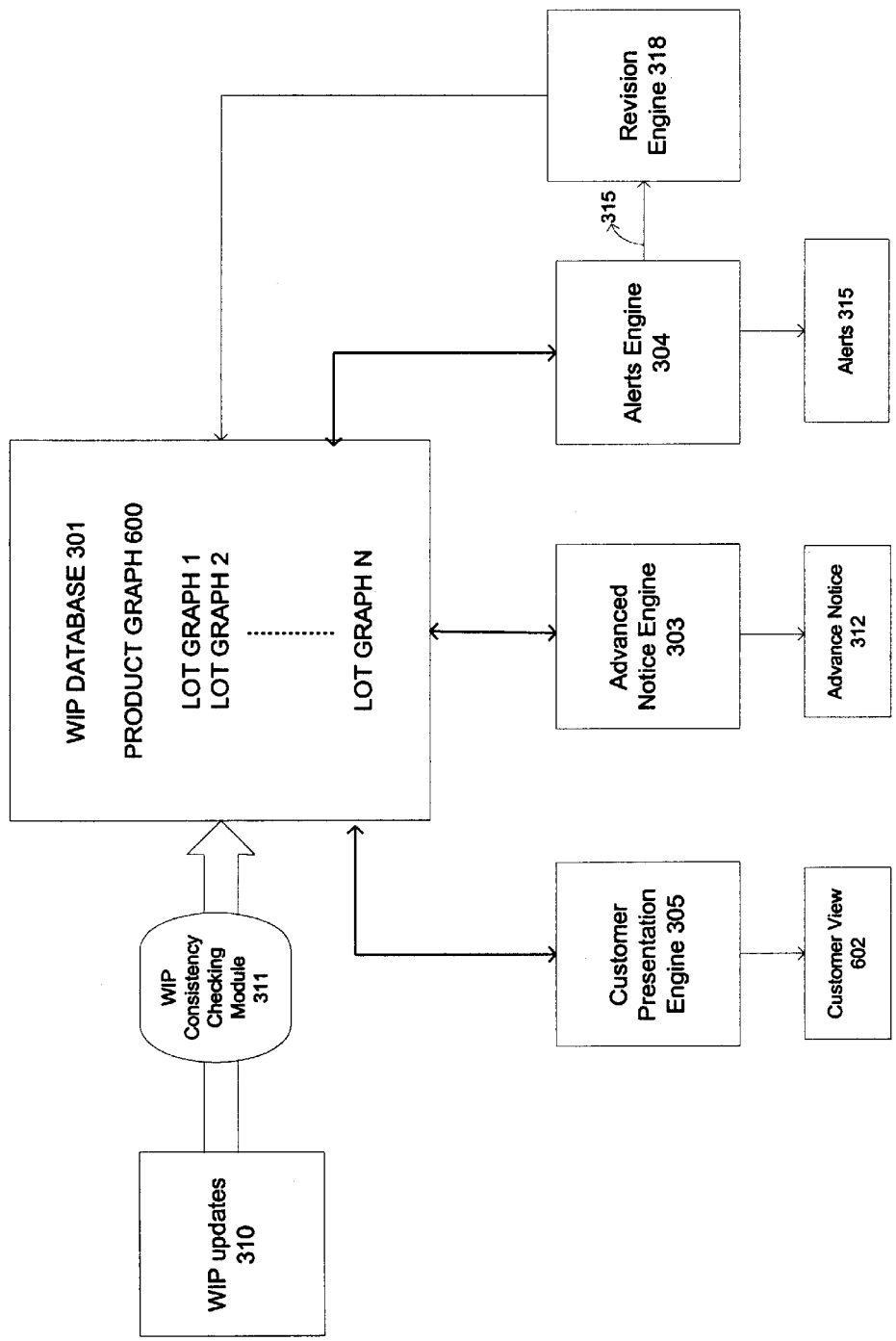
FIG. 6 is a schematic diagram illustrating operation of WIP analysis under the graph-based model as illustrated in FIG. 5.

As described previously, the WIP database 301 includes a data representation of the supply chain 102. FIGS. 5 and 6 show one way of implementing the data representation, which in this case is a graph-based model. The graph-based model is capable of supporting the various functions provided by the various engines described above.

The WIP database 301 includes a product graph (PG) for each distinct product to be manufactured. Orders for products typically are subdivided. One typical unit used in the semiconductor chain is a lot. For example, a lot may contain 25 wafers. Conventional WIP updates contain data with respect to each of the lots at a supply chain vendor. Correspondingly, as shown in FIG. 6, each product graph 600 is a collection of lot graphs (LGs), such as lot graphs 1, 2, . . . n. When the customer orders a product for the first time, a product graph is created to represent that product. When a new lot for that product is started, a lot graph(s) is created within the product graph to represent the supply chain and the progress of that lot through the supply chain. As the lot moves through the supply chain, however, it may be split into two or more lots, or joined with one or more other lots, following the internal logic of the vendors' practices. In a simple case, a single lot graph may represent a lot as it passes through all vendors in the supply chain. Alternatively, separate lot graphs may be merged together when different lots merge at a certain supply chain vendor or a lot graph may be split into a plurality of lot graphs if a lot in a supply chain is split and routed to different locations. One advantage of a graph-based representation is that these operations can be implemented efficiently.

FIG. 5 shows the data representation of the entire supply chain for one lot of a product. The data representation in FIG. 5 corresponds to the supply chain 102 shown in FIG. 1. In this case, a separate lot graph is generated for each vendor: lot graph 1 for vendor 1, lot graph 2 for vendor 2, etc. Each lot graph includes a plurality of nodes. In the example shown, each node corresponds to one of the process steps performed by the supply chain vendors: Step s1 is represented by node s1 in lot graph 1; step s'50 performed by vendor 2 is represented by node s'50 in lot graph 2, etc. The edges in FIG. 5 indicate interactions between the nodes of the lot graphs, i.e., between the process steps on the semiconductor manufacturing process. In one embodiment, the edges specify the order of execution of the steps. The edges between nodes internal to a lot graph (e.g., the edge from node s1 to node s2) may be represented by pointers internal to the lot graph or may even be implied by convention. The edges between nodes in adjacent lot graphs (e.g., the edge from node s120 to node s'1) may be implemented because lot graph 1 points to lot graph 2, thus implying that there is an edge between the last node in lot graph 1 and the first node in lot graph 2.

FIG. 5 also shows a plurality of node groups associated with the lot graphs. For example, a node group s1 corresponding to nodes s1 and s2 is associated with lot graph 1. As shown in FIG. 2C, the multiple steps done by a supply chain vendor can be grouped into step groups. Correspondingly, in the graph-based representation of the supply chain 102, the nodes can be grouped into node groups.

The graph-based model illustrated in FIG. 5 may be implemented in many ways. In one approach, an object-oriented computer language is used to implement the data structures shown. In one embodiment, each product graph, lot graph and node contains attributes for tracking WIP in the supply chain 102. The following are some examples. Other attributes may also be used.

Examples of attributes contained by the product graph include the customer's identity, the customer's part number for the product, and the fabless semiconductor vendor's part number for the product. Examples of attributes contained in the lot graph are the lot number, the identity of the vendor(s), the purchase order for the lot, and the time of the last WIP update received.

Each node contains data indicating when WIP passed through (or is expected to pass through) that node. For example, node attributes might include a unit of measure indicating the unit of measure for WIP in that node (e.g., wafer, die, etc.). Node attributes might also include quantity, start time and duration. These indicate the quantity of WIP which entered the node, the start time when they entered the node and the duration of time they remained in the node before exiting for the next node. Each of these attributes may be further subdivided into an original estimate, the actual value, and intRevised and exRevised values to support internal and customer presentations, as described above.

In addition, each node has an attribute conversion factor, which is used to estimate the expected good parts or quantity for customer delivery. The conversion factor is the factor which converts between the quantity of WIP at the current node and the final expected good parts. The conversion factor is determined by taking account of the expected yield for all of the remaining steps in the supply chain.

As an example, the computation of the "Expected Good Parts" (EGP) based on the quantity of WIP at the current node may be represented as follows:

$$EGP(StepK) = QTY(StepK) * ConversionFactor(StepK)$$

where StepK is a step in the supply chain as illustrated in FIG. 3, QTY(StepK) is the current quantity of WIP at StepK as measured in the units of measure of StepK. ConversionFactor accounts for the yield from StepK to the final product and also accounts for differences in units of measure. For example, if quantity at StepK is measured in wafers, then ConversionFactor also accounts for the number of dies per wafer, assuming that final good parts are measured in dies. The yield portion of ConversionFactor can be estimated by accumulating the incremental yield of each step remaining in the supply chain. In other words:

$$\text{Yield from StepK to end of supply chain} = \prod \text{Yield}(\text{Step } i)$$

where the product is taken over all steps after StepK and Yield(Step i) is the expected yield of step i.

Since supply chain vendors typically do not provide a yield estimate for every step (node) and manual entry of a yield per step is cumbersome, in an alternate embodiment, the steps are grouped into "yield groups," each of which has a yield factor. The conversion factor is based on the number of yield groups left in the supply chain (as opposed to individual steps remaining). For example, typical yield groups might include process, sort, assembly, and final test. In other words, certain steps are assigned to the yield group "process," others to "sort" and so on. Each yield group is represented by a single number, which represents the cumulative yield of all steps in that group. In this model, the conversion factor for any step in a particular process yield group would be the cumulative yield of all yields groups from the current one to the final product, plus a factor accounting for differences in units of measure. Note that different process flows will have different steps. Thus, it is important to map each step to a specific yield group in order to calculate its conversion factor.

It should be understood that the attributes given above are examples. Other attributes and/or other data structures can be used to track the progress of WIP through the supply chain.

FIG. 6 shows operation of the graph-based model for WIP tracking and analysis. A product graph 600 in the WIP database 301 represents a specific order for a particular part. The lot graphs 1, 2, . . . n contained in the product graph 600 represent the lots working their way through the supply chain. Different lots may utilize different supply chains.

During operation, WIP updates 310 are received from supply chain vendors, typically at regular time intervals. If the arriving WIP updates 310 indicate that a new product type is now active in the supply chain, the WIP tracking system 100 creates a new product graph for that product. If the WIP updates 310 correspond to a new lot for an existing order, a new lot graph(s) may be added to the appropriate product graph. The new lot graph will be initialized as described below. Further, the WIP tracking system 100 updates all the product graphs using the WIP updates 310. The WIP updates 310 are checked by the consistency module 311 to reduce the impact caused by any erroneous or missing WIP updates to a minimum.

To generate advance notices 312, the advance notice engine 303 determines how much WIP is how far away from transitioning to the next vendor. The advance notice engine aggregates across relevant product graphs, lot graphs and nodes. It uses the actual quantity attributes of the nodes to determine where WIP currently resides. It uses the intrevised durations for steps not yet executed to determine how far away the WIP is from transitioning to the next vendor. It uses the advanced notice rules database 309 to determine whether an advance notice 312 should be generated based on the current state of WIP.

The WIP tracking system 100 also performs alert analysis for the product graph 600. Alerts 315 are messages generated for use internally by the WIP tracking system 100. If, for example, the expected good parts to be delivered under product graph 600 is fewer than a predetermined threshold, an alert may be generated to bring this to the WIP tracking system 100's attention. As another example, if WIP updates are expected but do not arrive or if they are not in the correct format or otherwise fail some simple checks, an alert might be generated.

One type of alert analysis identifies discrepancies between actual status and the expected status. Typically, the intRevised figures rather than the Original Plan figures will be used to represent the expected status. This is because the Original Plan represents the original estimate of schedule and quantities; whereas intRevised represents the most recent updated estimate of schedule and quantities. A comparison against intRevised avoids the generation of multiple alerts for the same "mishap." As soon as the alert has been generated, the intRevised values of completion time and quantity for future steps in the lot graph are updated by the revision engine 318. Revisions can also be triggered by the update of the statistical process flow model for completion time and yields. For example, if better models revise the yield predictions or estimated times, these revised estimates are updated for future steps in the lot graph.

Figure 7B:
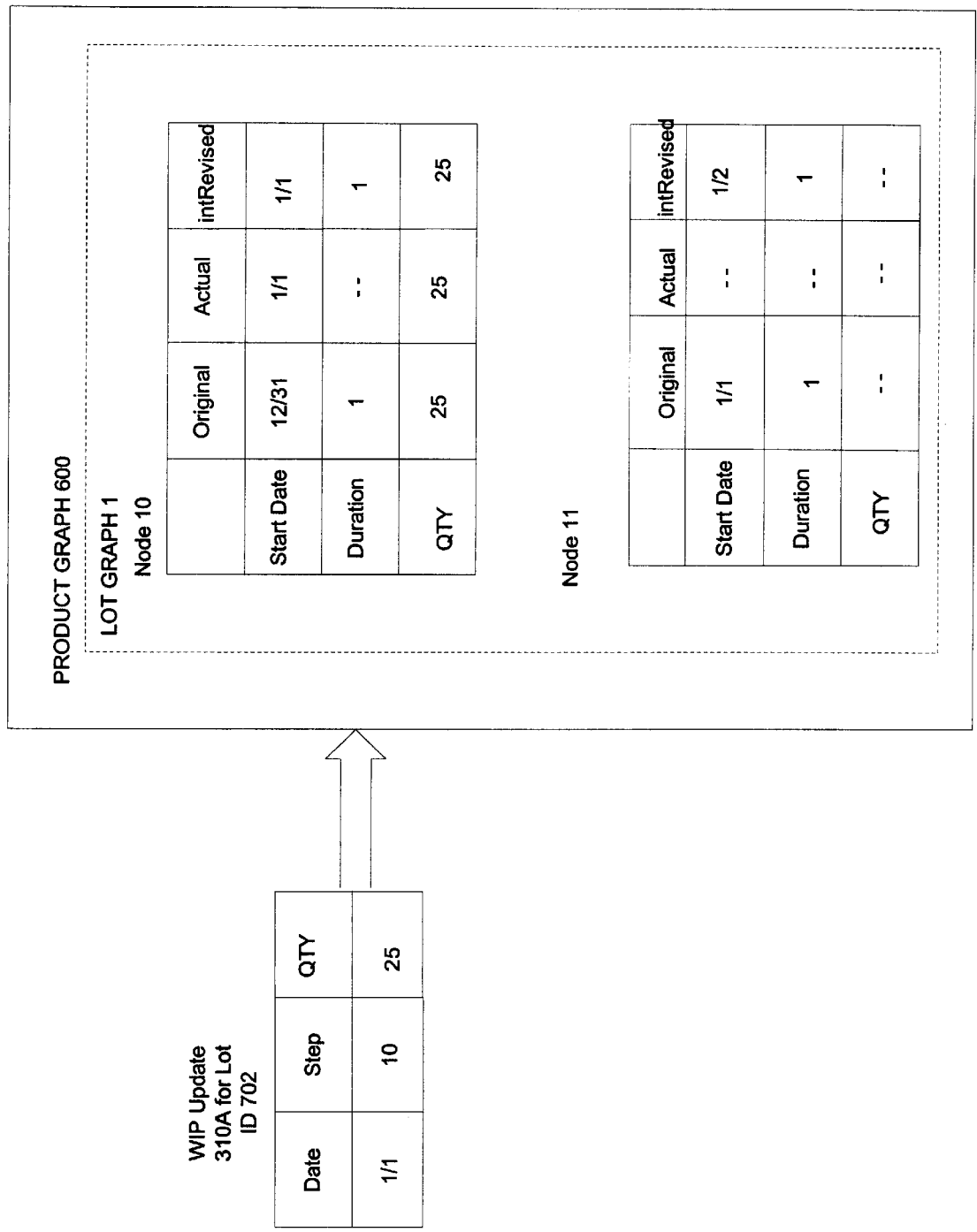
FIG. 7B illustrates an updating process of a graph-based WIP tracking system.

FIGS. 7A–7C illustrate in additional detail a process of initializing a lot graph and updating a lot graph. For ease of illustration, lot graph 1 of product graph 600 represents a Lot ID 702 that is currently processed by a vendor. For simplicity, assume that vendor has only one process which is described by Process Flow 709.

As described above, a lot graph for a product graph 600 is initialized when the corresponding order is submitted to the semiconductor chain vendor. In one embodiment, a Process Flow 709 is used to initialize lot graph 1. A Process Flow is basically a template for a vendor's process. It may have a similar data structure to a lot graph, but many of the attributes or fields are initialized to zero or not present. In the context of the example attributes given above, the Process Flow 709 for vendor's process includes a sequence of steps for the process, the original expected duration of each step and the original expected conversion factor. The sequence of steps is usually provided by the vendor. The duration and conversion factor of each step may be provided by the vendor, estimated, and/or statistically refined over time as actual data is collected. For example, a vendor may state that his process of 100 steps is estimated to take 80 days, in which case each step may initially be estimated to take 0.8 days.

Referring to FIG. 7A, the Process Flow 709 is used to initialize lot graph 1 which includes the vendor's process. Process Flow 709 indicates that the vendor's process includes steps 10 and 11, so the corresponding lot graph 1 has corresponding nodes 10 and 11. In addition, the Process Flow 709 indicates that the expected duration for step 10 and step 11 is each 1 day and the conversion factor for both steps is 200. When initializing the corresponding entries in lot graph 1, the entry of original duration for node 10 (step 10) and node 11 (step 11) is thus 1 day and the entry for original conversion factor for both steps (not shown in FIG. 7A) is 200. The Original values typically will not change. The intRevised values are the same as the Original values since this is an initialization stage and no deviation from the original plan has yet occurred. The Actual start date, duration, and QTY (quantity) values are left blank since the WIP in Lot ID 702 has not yet progressed to steps 10 and 11.

Referring to FIG. 7B, assume that WIP update 310A is received from vendor on 1/1 for Lot ID 702. The WIP update 310 indicates that Lot ID 702 entered step 10 on 1/1 and the quantity at that point was 25 (wafers). Therefore, lot graph 1 is updated to insert an entry "1/1" in the "Actual Start Time" for node 10 and to insert an entry "25" in the "Actual QTY". intRevised is updated similarly. In addition, the lot is now one day behind schedule, so intRevised start date for step 10 is revised to 1/2 to reflect the one day delay.

Not all status changes will be automatically reflected in the intRevised values, as the revision engine 318 updates the intRevised values according to its logic. In the example above, the intRevised start date for step 10 was delayed by one day to 1/2. However, in an alternate embodiment, delays are not reflected in intRevised unless they exceed a threshold. If the threshold for this lot was set to be two days, for example, then the intRevised start date for step 10 would not be revised. In another approach, the threshold is calculated as a percentage of the remaining processing time at that vendor. Thus, assume that step 10 is part of a 120 step process which is expected to take 90 days, the time from step 10 to the end of the process is estimated as 85 days, and the percentage threshold is selected as 10%. In this case, the calculated threshold at step 10 is 10% of 85 days=8.5 days and intRevised would not be changed.

In FIG. 7C, WIP update 310B is received, indicating that Lot ID 702 entered step 11 on 1/6 with 24 wafers. The Actual and intRevised start dates and quantities for node 11 are revised to 1/6 and 24 to reflect the actual start date and quantity. The Actual and intRevised durations for node 10 are also revised to reflect the actual duration of 5 days in step 10.

Figure 8:
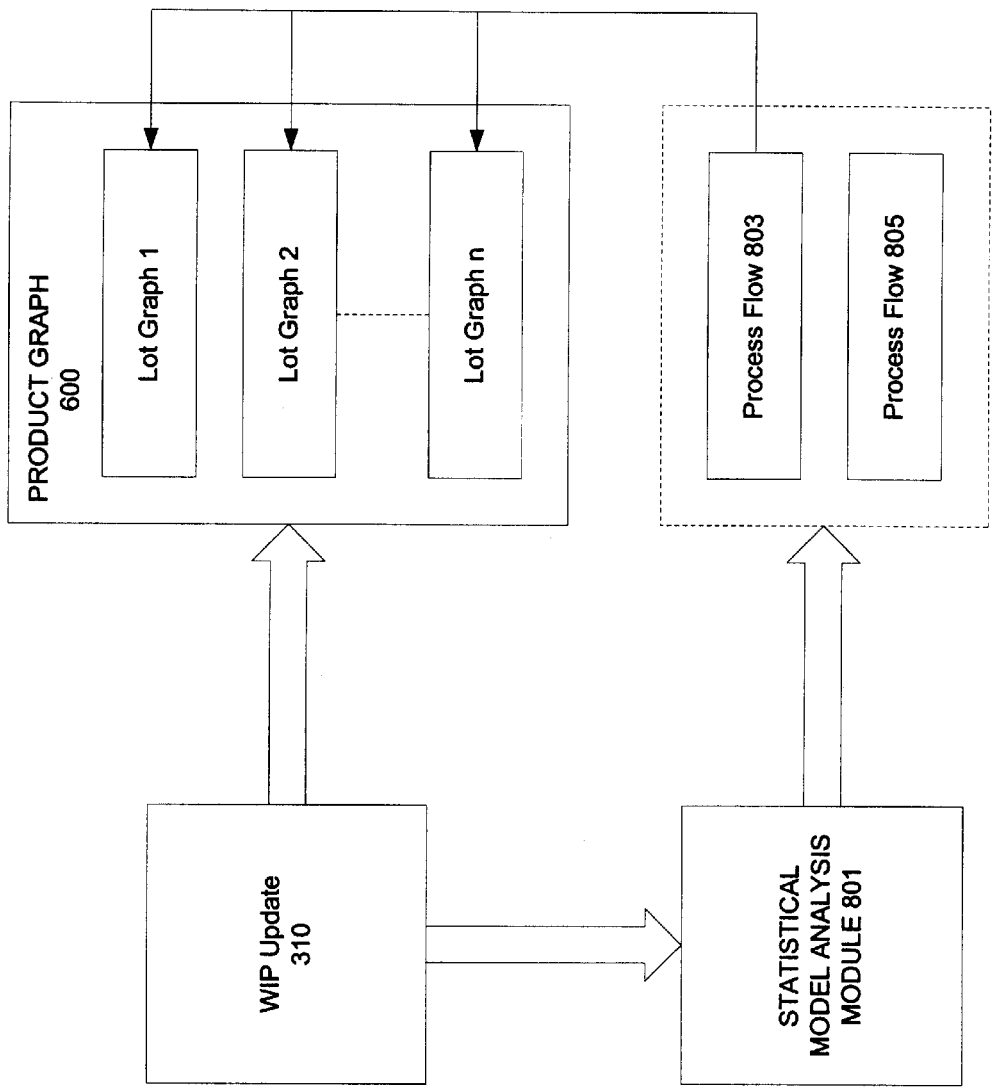
FIG. 8 illustrates a process of updating a graph-based WIP tracking system using a statistical model.

Referring to FIG. 8, the Process Flow can be used not only for initializing lot graphs, but also for accurately estimating WIP tracking report information based on a statistical model. A statistical model analysis module 801 is used in the WIP tracking system 100 to refine the Process Flows 803, 805. As described above, the Process Flows are used to initialize durations and quantities for each process node in the graph-based model. These durations are used to estimate times—e.g., expected time remaining until WIP transitions to the next vendor. In order to provide more reliable WIP tracking, data pertinent to each vendor's process, each customer product and other relevant variables are collected and used to refine the expected duration and yield of each step. Thus, when a lot graph is initialized or revised, the completion times and yields are based on refined estimates. Statistical analysis can also lead to statistical qualification of the advanced notices (e.g., we have 80% confidence that 2000 units will be shipped to you in 3 days). These all will lead to higher vendor confidence in the advanced notices. The updated estimates may also be used to refine the estimated durations and conversion factors contained in already existing lot graphs 1-n.

Figure 9:
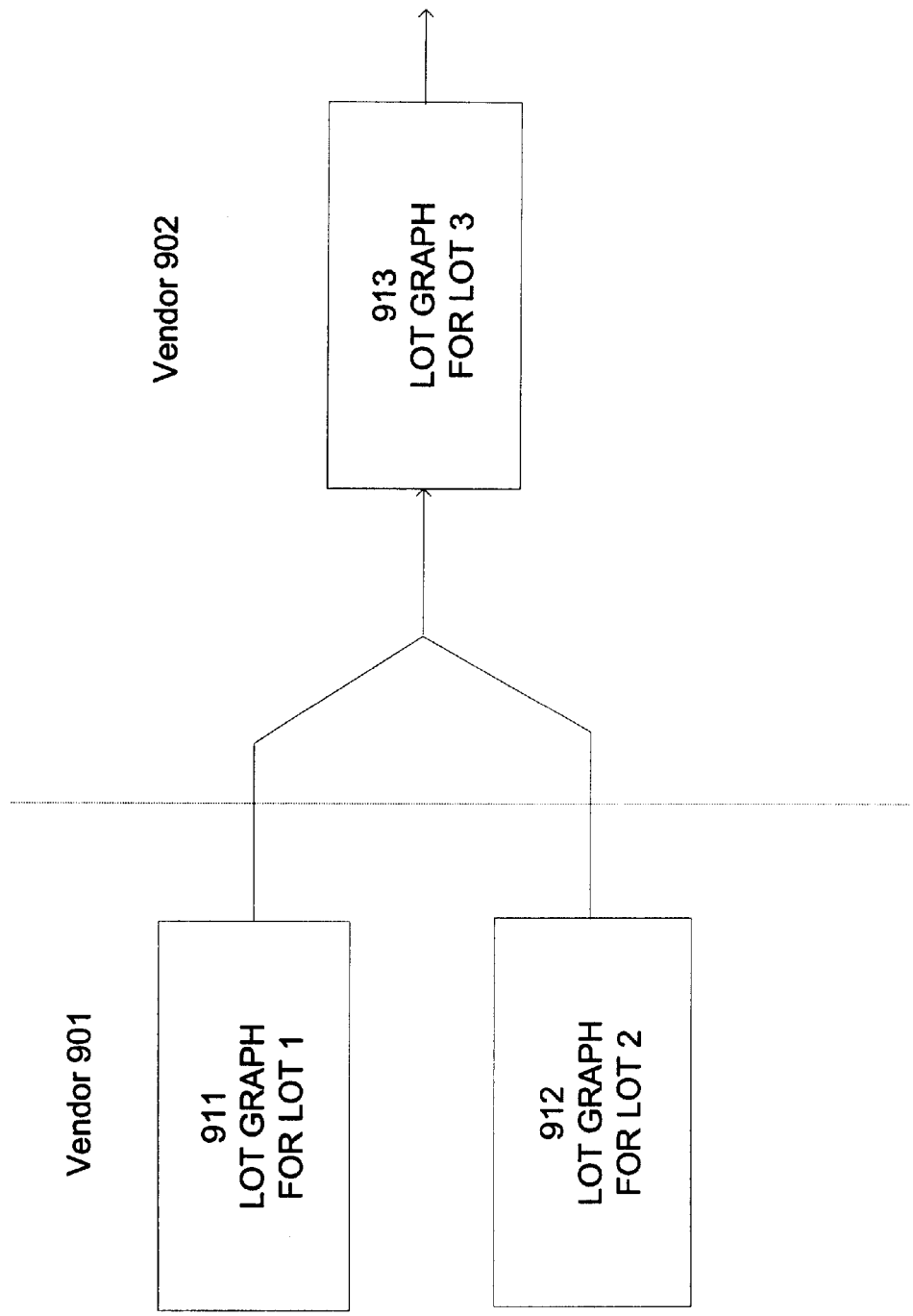
FIG. 9 illustrates a lot join process using a graph-based WIP tracking system.

FIG. 9 shows a Lot Join process in a graph-based data model of the supply chain. Assume that Lot 1 and Lot 2 are two lots which are being processed by supply chain vendor 901. Both of the lots will be sent to another supply chain vendor 902 but merged into a single lot—Lot 3. Under the graph-based model, lot graph 911 and 912 exist for Lots 1 and 2. A new lot graph 913 is created to correspond to the merged lot, Lot 3. The Lot Join is effected using pointers. Each lot graph has a pointer indicating the next lot graph. The pointers for lot graphs 911 and 912 each point to lot graph 913.

Figure 10:
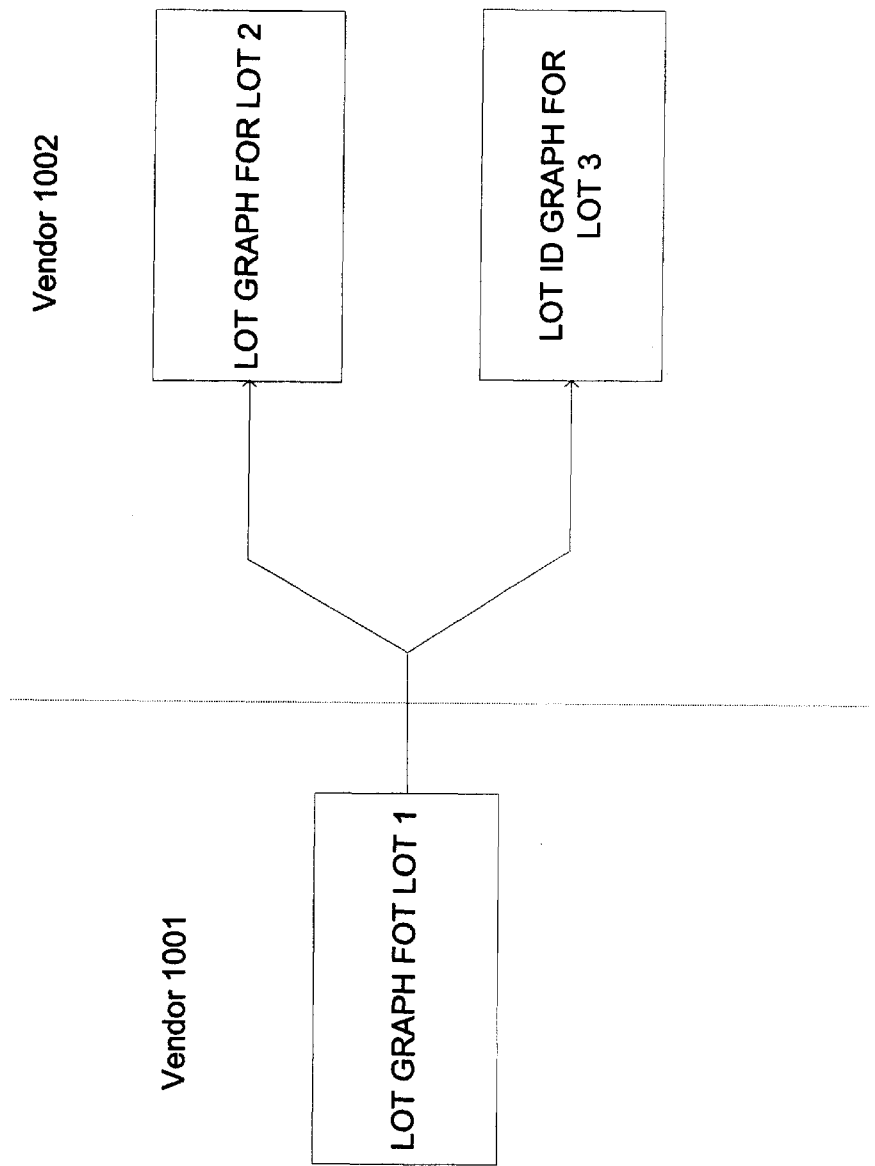
FIG. 10 illustrates a lot split process using a graph-based WIP tracking system.

FIG. 10 shows a Lot Split process in a graph based data model of the supply chain. In this case Lot 1 at vendor 1001 is split into two lots: Lots 2 and 3 at vendor 1002 (or at two different vendors). The Lot Split is effected by having lot graph 1011 for Lot 1 point to both lot graphs 1012 and 1013 (for Lots 2 and 3).

Upon reading this disclosure, those of skill in the art will appreciate additional alternative methods and designs for providing WIP tracking reports and advance notices to coordinate semiconductor supply chain vendors in accordance with the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method of the present invention disclosed herein without departing from the spirit and scope of the invention as defined in the appended claims. Accordingly, the disclosure of the present invention is intended to be illustrative, but not limiting, of the scope of the invention, which is set forth in the following claims.

What is claimed is:

1. A method implemented by computer for coordinating the manufacture of a semiconductor product by a semiconductor supply chain, the semiconductor supply chain comprising a first vendor and a second vendor, the method comprising the steps of:

receiving a first work in progress (WIP) updates from the first vendor;

performing a first update of a data representation of the semiconductor supply chain to reflect the first WIP update;

generating a first advance notice for the second vendor based on the first updated data representation and a first pre-determined rule; and making the first advance notice available to the second vendor.

2. A method implemented by computer for coordinating the manufacture of a semiconductor product by a semiconductor supply chain, the semiconductor supply chain comprising a plurality of vendors, the method comprising the steps of:

receiving work in progress (WIP) updates from at least one upstream vendor;

updating a data representation of the semiconductor supply chain to reflect the received WIP updates;

generating an advance notice for a downstream vendor based on the updated data representation and a pre-determined rule; and making the advance notice available to the downstream vendor.

3. The method of claim 2 wherein:

the advance notice includes an estimate of a volume of material expected to arrive at die downstream vendor at a certain time; and the step of generating the advance notice comprises: estimating said volume based on the updated data representation.

4. The method of claim 3 wherein the volume of material expected to arrive at the downstream vendor is an aggregate volume from multiple upstream vendors.

5. The method of claim 3 wherein the estimate is statistically qualified.

6. The method of claim 3 further comprising:
performing statistical analysis of past performance of an upstream vendor; and
wherein the step of estimating the volume of material expected to arrive at the downstream vendor at a certain time is based in part on the statistical analysis.

7. The method of claim 2 wherein the pre-determined rule is specified by the downstream vendor.

8. The method of claim 2 wherein the step of receiving WIP updates from at least one upstream vendor comprises:
receiving WIP updates from all upstream vendors in the semiconductor supply chain.

9. The method of claim 2 wherein the step of generating an advance notice comprises:
generating the advance notice only if such advance notice is requested by the downstream vendor.

10. The method of claim 2 further comprising:
receiving further WIP updates from the upstream vendor (s);
further updating the data representation of the semiconductor supply chain to reflect the further WIP updates;
generating a second advance notice for the downstream vendor based on the further updated data representation and a second pre-determined rule; and
making the second advance notice available to the do downstream vendor.

11. The method of claim 2 wherein:
the downstream vendor is supplied by at least two upstream vendors; and
the pre-determined business rule depends upon the at least two upstream vendors.

12. The method of claim 2 further comprising:
consistency checking the WIP updates; and
updating the data representation of the semiconductor supply chain to reflect only those received WIP updates which have passed the consistency check.

13. The method of claim 2 wherein the data representation of the semiconductor supply chain includes a graph-based model of the semiconductor supply chain.

14. The method of claim 13 wherein the graph-based model of the semiconductor supply chain comprises:
a plurality of nodes connected by edges, wherein each node represents one step in the semiconductor supply chain and each edge indicates a dependency between the nodes connected by said edge.

15. The method of claim 14 wherein the graph-based model of the semiconductor supply chain comprises:
a product graph for the semiconductor product and the product graph includes a plurality of lot graphs, wherein:
each lot graph is a representation of the task(s) performed by at least one vendor on at least one lot of the semiconductor product; and
each lot graph includes a plurality of nodes connected by edges, wherein each node represents one step in the task(s) represented by the lot graph and each edge indicates a dependency between the nodes connected by said edge.

16. The method of claim 14 wherein each node includes attributes sufficient to determine the following:
a volume of material entering the step corresponding to the node,
a time when said material entered said step, and
a time when said material exited said step.

17. The method of claim 14 wherein each node includes attributes and at least one attribute includes the following versions:
an original estimate of said attribute,
a current estimate of said attribute, and
an actual value of said attribute.

18. The method of claim 14 wherein:
each node includes a conversion factor and estimated duration for said node;
the advance notice includes an estimate of a volume of material expected to arrive at the downstream vendor at a certain time; and
the step of generating the advance notice comprises:
estimating said volume based on the actual volume of material at each node, the conversion factor for said node, and the estimated duration for said node.

19. A WIP tracking system for coordinating the manufacture of a semiconductor product by a semiconductor supply chain, the semiconductor supply chain comprising a plurality of vendors, the WIP tracking system comprising:
a WIP database containing a data representation of the semiconductor supply chain;
a revision engine coupled to the WIP database for updating the WIP database to reflect WIP updates received from at least one upstream vendor;
a rules database containing pre-determined rules for generating advance notices; and
an advance notice engine coupled to the WIP database and the rules database for generating an advance notice for a downstream vendor based on the updated WIP database and a pre-determined rule.

20. The WIP tracking system of claim 19 wherein:
the advance notice includes an estimate of a volume of material expected to arrive at the downstream vendor at a certain time; and
the advance notice engine estimates said volume based on the updated WIP database.

21. The WIP tracking system of claim 20 wherein the advance notice engine aggregates the volume of material expected to arrive at the downstream vendor across multiple upstream vendors.

22. The WIP tracking system of claim 20 wherein the advanced notice engine statistically qualifies the estimated volume.

23. The WIP tracking system of claim 20 wherein:
the revision engine performs statistical analysis of past performance of an upstream vendor and updates the WIP database to reflect the statistical analysis; and
the advance notice engine estimates the volume of material expected to arrive at the downstream vendor at a certain time based in part on the statistical analysis.

24. The WIP tracking system of claim 19 wherein tho pre-determined rule is specified by the downstream vendor.

25. The WIP tracking system of claim 19 wherein the advance notice engine generates an advance notice only if such advance notice is requested by the downstream vendor.

26. The WIP tracking system of claim 19 wherein:
the revision engine further updates the WIP database to reflect further WIP updates received from the upstream vendor(s); and the advance notice engine generates a second advance notice for the downstream vendor based on the further updated WIP database and a second pre-determined rule.

27. The WIP tracking system of claim 19 wherein:
the downstream vendor is supplied by at least two upstream vendors; and
the pre-determined business rule depends upon the at least two upstream vendors.

28. The WIP tracking system of claim 19 further comprising:
a consistency checking module for consistency checking the received WIP updates, wherein the WIP database is updated to reflect only those received WIP updates which have passed the consistency check.

29. The WIP tracking system of claim 19 wherein the WIP database includes a graph-based model of the semiconductor supply chain.

30. The WIP tracking system of claim 29 wherein the graph-based model of the semiconductor supply chain comprises:
a plurality of nodes connected by edges, wherein each node represents one step in the semiconductor supply chain and each edge indicates a dependency between the nodes connected by said edge.

31. The WIP tracking system of claim 30 wherein the graph-based model of the semiconductor supply chain comprises:
a product graph for the semiconductor product and the product graph includes a plurality of lot graphs, wherein:
each lot graph is a representation of the task(s) performed by at least one vendor on at least one lot of the semiconductor product; and
each lot graph includes a plurality of nodes connected by edges, wherein each node represents one step in the task(s) represented by the lot graph and each edge indicates a dependency between the nodes connected by said edge.

32. The WIP tracking system of claim 30 wherein each node includes attributes sufficient to determine the following:
a volume of material entering the step corresponding to the node,
a time when said material entered said step, and
a time when said material exited said step.

33. The WIP tracking system of claim 30 wherein each node includes attributes and at least one attribute includes the following versions:
an original estimate of said attribute,
a current estimate of said attribute, and
an actual value of said attribute.

34. The WIP tracking system of claim 30 wherein:
each node includes a conversion factor and estimated duration for said node;
the advance notice includes an estimate of a volume of material expected to arrive at the downstream vendor at a certain time; and
the advance notice engine generates the advance notice by estimating said volume based on the actual volume of material at each node, the conversion factor for said node, and the estimated duration for said node.

35. A WIP tracking system for coordinating the manufacture of a semiconductor product by a semiconductor supply chain, the semiconductor supply chain comprising a plurality of vendors, the WIP tracking system comprising:

means for updating a data representation of the semiconductor supply chain to reflect WIP updates received from at least one upstream vendor;
means for generating an advance notice for a downstream vendor based on the updated data representation and a pre-determined rule; and
means for making the advance notice available to the downstream vendor.

36. The WIP tracking system of claim 35 wherein:
the advance notice includes an estimate of a volume of material expected to arrive at the downstream vendor at a certain time; and
the means for generating the advance notice comprises:
means for estimating said volume based on the updated data representation.

37. The WIP tracking system of claim 36 wherein the volume of material expected to arrive at the downstream vendor is an aggregate volume from multiple upstream vendors.

38. The WIP tracking system of claim 36 wherein the estimate is statistically qualified.

39. The WIP tracking system of claim 36 further comprising:
means for performing statistical analysis of past performance of an upstream vendor; and
wherein the means for estimating the volume of material expected to arrive at the downstream vendor at a certain time is based in part on the statistical analysis.

40. The WIP tracking system of claim 35 further comprising:
means for consistency checking the WIP updates; and
means for updating the data representation of the semiconductor supply chain to reflect only those received WIP updates which have passed the consistency check.

41. The VIP tracking system of claim 35 wherein the data representation of the semiconductor supply chain includes a graph-based model of the semiconductor supply chain.

42. The WIP tracking system of claim 41 wherein the graph-based model of the semiconductor supply chain comprises:
a plurality of nodes connected by edges, wherein each node represents one step in the semiconductor supply chain and each edge indicates a dependency between the nodes connected by said edge.

43. The WIP tracking system of claim 42 wherein the graph-based model of the semiconductor supply chain comprises:
a product graph for the semiconductor product and the product graph includes a plurality of lot graphs, wherein:
each lot graph is a representation of the task(s) performed by at least one vendor on at least one lot of the semiconductor product; and
each lot graph includes a plurality of nodes connected by edges, wherein each node represents one step in the task(s) represented by the lot graph and each edge indicates a dependency between the nodes connected by said edge.

44. The WIP tracking system of claim 42 wherein each node includes attributes sufficient to determine the following:
a volume of material entering the step corresponding to the node,
a time when said material entered said step, and
a time when said material exited said step.

45. The WIP tracking system of claim 42 wherein each node includes attributes and at least one attribute includes the following versions:
- an original estimate of said attribute,
- a current estimate of said attribute, and
- an actual value of said attribute.

46. The WIP tracking system of claim 42 wherein:
- each node includes a conversion factor and estimated duration for said node;
- the advance notice includes an estimate of a volume of material expected to arrive at the downstream vendor at a certain time; and
- the step of generating the advance notice comprises:
  - estimating said volume based on the actual volume of material at each node, the conversion factor for said node, and the estimated duration for said node.

\* \* \* \* \*

UNITED STATES PATENT AND TRADEMARK OFFICE
CERTIFICATE OF CORRECTION

PATENT NO. : 6,748,287 B1
DATED : June 8, 2004
INVENTOR(S) : Klaus ten Hagen and Michael E. Orshansky It is certified that error appears in the above-identified patent and that said Letters Patent is hereby corrected as shown below:

Column 16,
Line 64, please replace "die" with -- the --.

Column 18,
Line 59, please replace "tho" with -- the --.

Signed and Sealed this

Fourteenth Day of September, 2004

JON W. DUDAS
*Director of the United States Patent and Trademark Office*